(12) United States Patent  
McKenzie et al.

(10) Patent No.: US 7,044,348 B2
(45) Date of Patent: May 16, 2006

(54) MODULAR STORAGE SYSTEM

(75) Inventors: John S. McKenzie, Ferndale, MI (US); Jeff A. Kempf, Romeo, MI (US)

(73) Assignee: Lear Corporation, Southfield, MI (US)

( * ) Notice: Subject to any disclaimer, the term of this patent is extended or adjusted under 35 U.S.C. 154(b) by 201 days.

(21) Appl. No.: 10/401,165

(22) Filed: Mar. 27, 2003

(65) Prior Publication Data  
US 2004/0188481 A1  Sep. 30, 2004

(51) Int. Cl.  
*B60R 11/00* (2006.01)

(52) U.S. Cl. ............... 224/539; 224/318; 224/925; 224/319; 224/328; 224/563

(58) Field of Classification Search ............ 224/539, 224/318, 314, 925, 319, 328, 555, 563, 560, 224/561  
See application file for complete search history.

(56) References Cited

U.S. PATENT DOCUMENTS

| | | | | |
|---|---|---|---|---|
| 1,369,448 A * | 2/1921 | McNab | ............ | 383/20 |
| 1,387,597 A * | 8/1921 | Fetters | ............ | 190/107 |
| 2,576,327 A * | 11/1951 | Wright | ............ | 224/547 |
| 2,778,554 A * | 1/1957 | Porkola | ............ | 224/553 |
| 2,830,748 A * | 4/1958 | Faltin | ............ | 224/555 |
| 3,000,419 A * | 9/1961 | Morrison | ............ | 224/318 |
| 3,132,794 A * | 5/1964 | Frazier | ............ | 383/22 |
| 3,209,971 A * | 10/1965 | Goodell | ............ | 224/319 |
| 3,263,881 A * | 8/1966 | Wooten | ............ | 224/315 |
| 3,476,162 A * | 11/1969 | McMiller | ............ | 224/315 |
| 3,512,226 A * | 5/1970 | Carlile | ............ | 24/669 |
| 3,565,305 A * | 2/1971 | Belokin, Jr. | ............ | 224/328 |
| 3,598,297 A * | 8/1971 | Welch | ............ | 224/558 |
| 3,861,504 A * | 1/1975 | McGraw | ............ | 190/110 |
| 4,249,663 A * | 2/1981 | Hewlett | ............ | 209/705 |
| 4,342,411 A * | 8/1982 | Bott | ............ | 224/319 |
| 4,387,840 A * | 6/1983 | Popeney | ............ | 224/314 |
| 4,592,601 A | 6/1986 | Hlinsky et al. | | |
| 4,718,583 A * | 1/1988 | Mullican | ............ | 224/404 |
| 4,728,017 A * | 3/1988 | Mullican | ............ | 224/404 |
| 5,092,507 A | 3/1992 | Szablak et al. | | |
| 5,096,107 A * | 3/1992 | VanSon | ............ | 224/328 |
| 5,372,289 A | 12/1994 | Dachicourt | | |
| 5,460,304 A | 10/1995 | Porter et al. | | |
| 5,492,257 A | 2/1996 | Demick | | |
| 5,535,931 A | 7/1996 | Barlow et al. | | |
| 5,568,890 A | 10/1996 | Magee et al. | | |
| 5,636,890 A | 6/1997 | Cooper | | |
| 5,769,293 A * | 6/1998 | Zaretsky | ............ | 224/551 |
| 5,782,392 A * | 7/1998 | Yamamoto | ............ | 224/326 |
| 5,871,280 A * | 2/1999 | Watters | ............ | 383/41 |
| 5,896,962 A * | 4/1999 | Smith et al. | ............ | 190/107 |
| 5,915,777 A | 6/1999 | Gignac et al. | | |
| 5,938,035 A * | 8/1999 | Oglesby et al. | ............ | 206/576 |
| 6,026,646 A | 2/2000 | Hansen et al. | | |
| 6,081,974 A * | 7/2000 | McDaid | ............ | 24/265 CD |
| 6,196,605 B1 | 3/2001 | Baldas et al. | | |
| 6,257,470 B1 * | 7/2001 | Schaefer | ............ | 224/318 |
| 6,322,123 B1 | 11/2001 | Garrison et al. | | |
| 6,386,412 B1 | 5/2002 | Konechne | | |
| 6,422,440 B1 * | 7/2002 | Stone | ............ | 224/275 |
| 6,481,773 B1 | 11/2002 | Salani et al. | | |
| 2002/0005649 A1 | 1/2002 | Hofmann et al. | | |

\* cited by examiner

*Primary Examiner*—Tri Mai  
(74) *Attorney, Agent, or Firm*—MacMillan, Sobanski & Todd, LLC

(57) ABSTRACT

A storage system including an outer covering enclosing an interior modular unit containing separate storage units for a vehicle.

7 Claims, 4 Drawing Sheets

MODULAR STORAGE SYSTEM

FIELD OF THE INVENTION

The present invention relates to a storage system for vehicles and more particularly to a storage system including a soft pack outer covering enclosing an interior modular unit containing separate storage units.

BACKGROUND OF THE INVENTION

Vehicle owners with demanding, active lifestyles require additional vehicle storage compartments used to transport a multitude of various items including, for example, athletic attire, after work clothing including shoes, and personal items and cosmetics to name a few. Many different storage systems have been suggested to transport such goods and prevent them from sliding around in the vehicle during transport. However, there continues to exist a need for a portable, rear compartment storage system for vehicles that is innovative, low cost, and applicable to a broad spectrum of vehicle platforms.

Motor vehicle manufacturers offer many different types of devices in which to store items. A first known type of storage device is permanently installed in the vehicle and provides storage for items while the items are in the vehicle. An example of this first type of storage device is a console located between the front seats of a vehicle. A second known type of storage device exists that may be removed from the vehicle and is commonly attached to the exterior of the vehicle on either the roof or to a trailer hitch. One example of the second type of storage device is a roof mounted carrier.

Both of these known styles of storage devices have proven to be satisfactory for their intended purposes of storing goods in the vehicle. However, these devices are not particularly well suited to moving goods away from the vehicle. The first type may not be removed from the vehicle at all and the second is generally large or cumbersome. Thus, goods must generally be individually removed from them in order to remove the goods from the vehicle. It is, therefore, desirable to provide a storage unit in which goods may be stored while in the vehicle and in which the goods may remain when moved from the vehicle. In order to address situations where this is desirable, various designs have been proposed.

For example, U.S. Pat. No. 5,636,890 discloses a vehicular storage compartment that mounts in the opening of a vehicle floor. The storage compartment is generally tub-shaped and has a closure panel across the top. When mounted in a recess within a vehicle floor, the closure panel acts as a load floor in concert with the vehicle floor. The tub-shaped compartment is removable and may store items exclusive of a vehicle; however, the use thereof is limited to that of conventional storage tubs, which are bulky and awkward to use for portable storage.

U.S. Pat. No. 5,372,289 discloses a luggage rack adapted to attach to the inside ceiling of vehicle trunk. The luggage rack retains a storage module also referred to as a piece of luggage. The storage module is generally rectangular and may store items either within the vehicle or exclusive of the vehicle. The storage module's use, however, is limited to that of conventional storage tubs, which are awkward to use for portable storage exclusive of the vehicle. Additionally, the storage module is retained in the trunk of a vehicle, which makes items stored therein less accessible to an occupant than items stored in a storage unit within the cab of a vehicle. In order to generally provide easy removal and portable transport of vehicular storage units and items stored therein, and to improve access to items stored within a vehicular storage unit by vehicle occupants, various removable vehicular storage units have been developed.

In order to generally provide easy removal and portable transport of vehicular storage units and items stored therein, and to improve access to items stored within a vehicular storage unit by vehicle occupants, various removable vehicular storage units have been developed.

It is an object of the invention to produce a storage system for use in a vehicle which can be selectively removed from the vehicle.

Another object of the invention is to produce a storage system for use in a vehicle which includes a soft pack outer covering and having at least one interior modular storage unit.

Still another object of the invention is to produce a soft pack modular storage system for a vehicle that is selectively and accessibly retained within the trunk space of the vehicle and can be removed and used as a portable storage system remote of the vehicle.

SUMMARY OF THE INVENTION

The above, as well as other objects and advantages may be typically achieved by a soft pack modular storage system for a vehicle comprising at least one enclosure formed of flexible sheet material having a hollow interior and a selectively operable closure to provide access to the hollow interior; a dimensionally stable storage container slidingly received within the hollow interior of said enclosure; a bracket means for selectively receiving said enclosure; and a fastener for anchoring said bracket means to the cargo area of a motor vehicle.

BRIEF DESCRIPTION OF THE DRAWINGS

The above objects of the invention will be readily understood by those skilled in the art from reading the following detailed description of the preferred embodiments of the invention when considered in the light of the accompanying drawings in which.

DETAILED DESCRIPTION OF THE PREFERRED EMBODIMENT OF THE INVENTION

Figure 1:
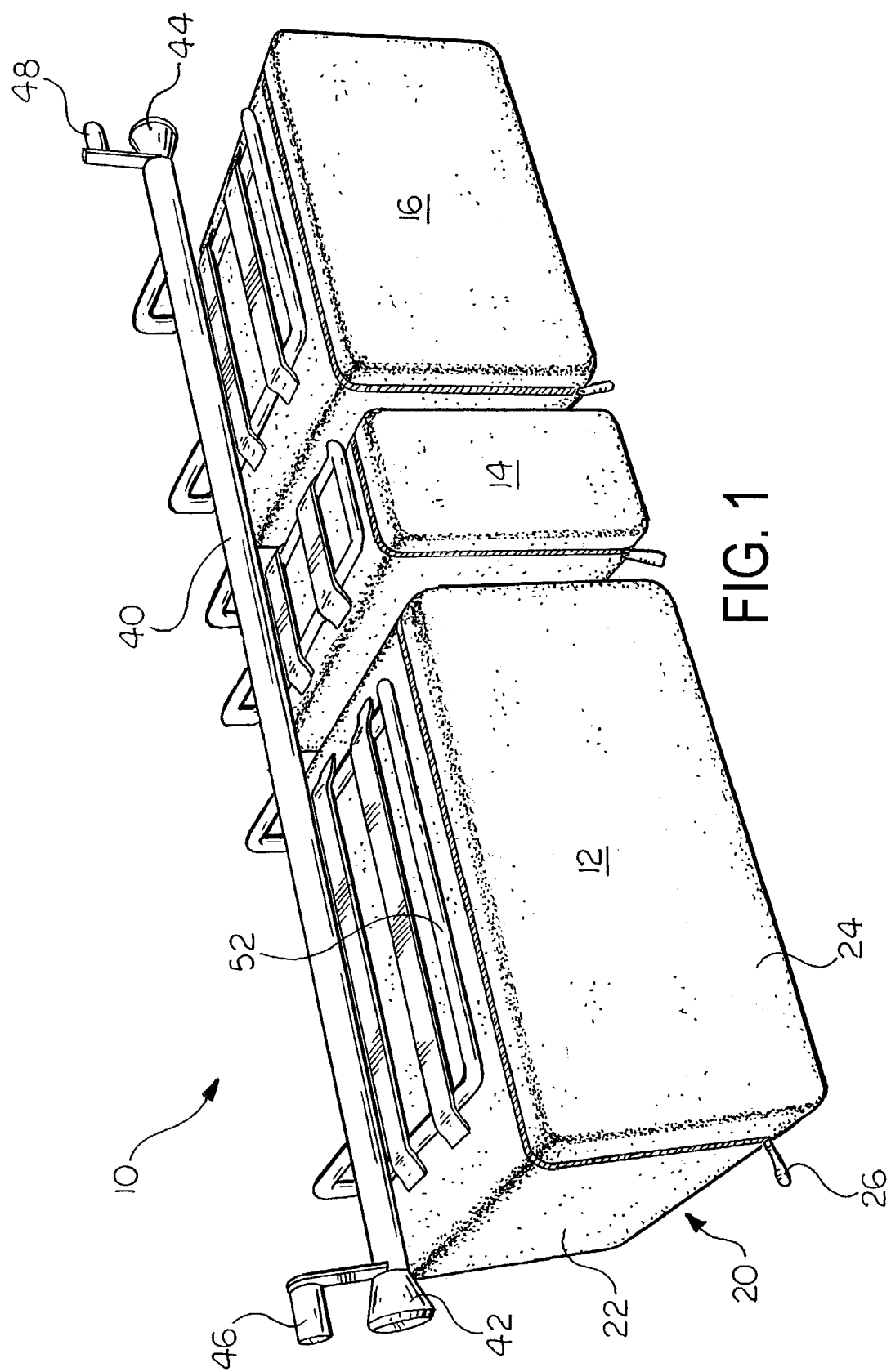
FIG. 1 is a fragmentary, perspective view of the trunk of a vehicle showing a modular storage system incorporating the features of the invention.
Figure 2:
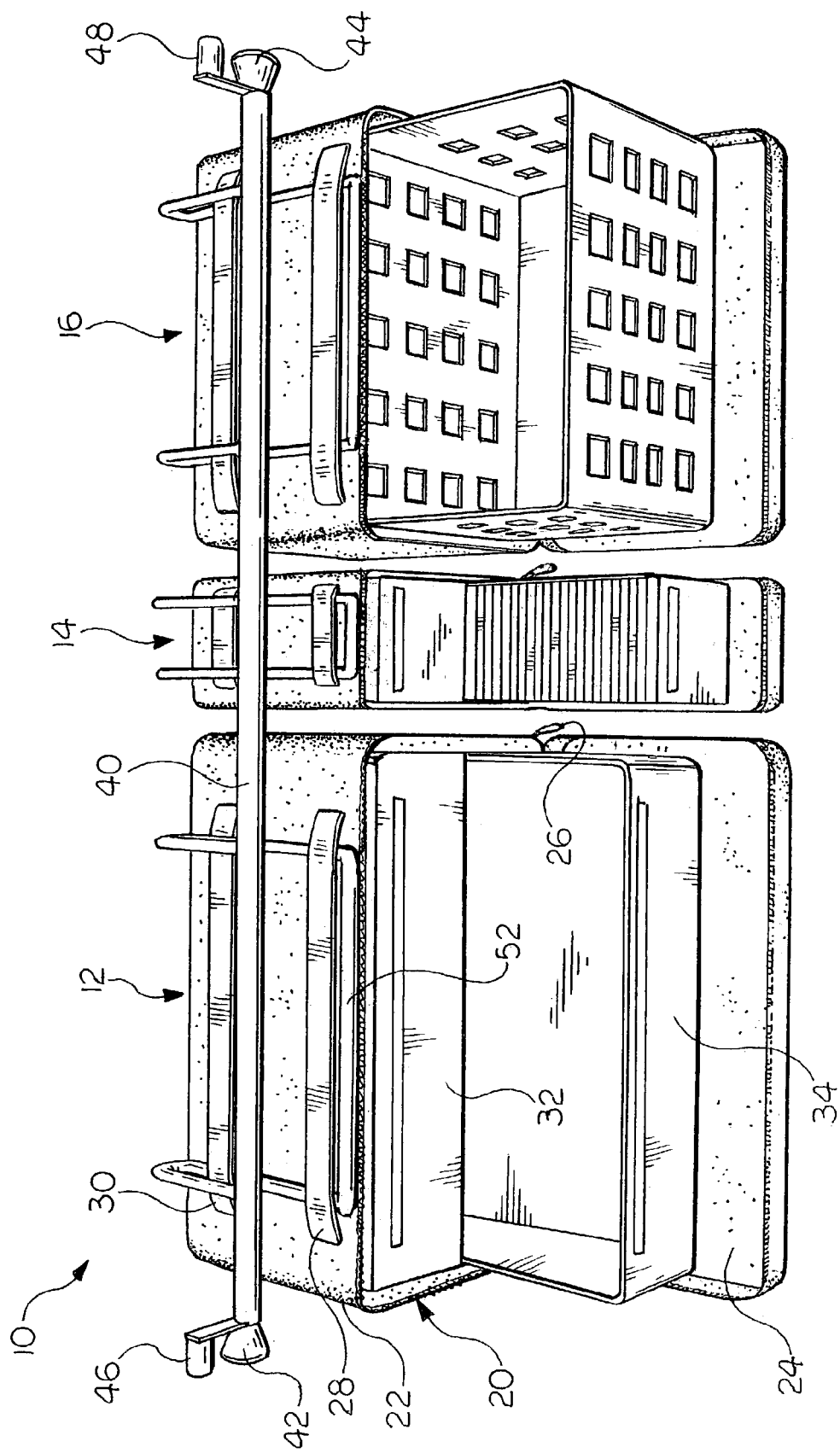
FIG. 2 is a fragmentary perspective view of the storage system illustrated in FIG. 1 showing the modular storage units in an open position.
Figure 3:
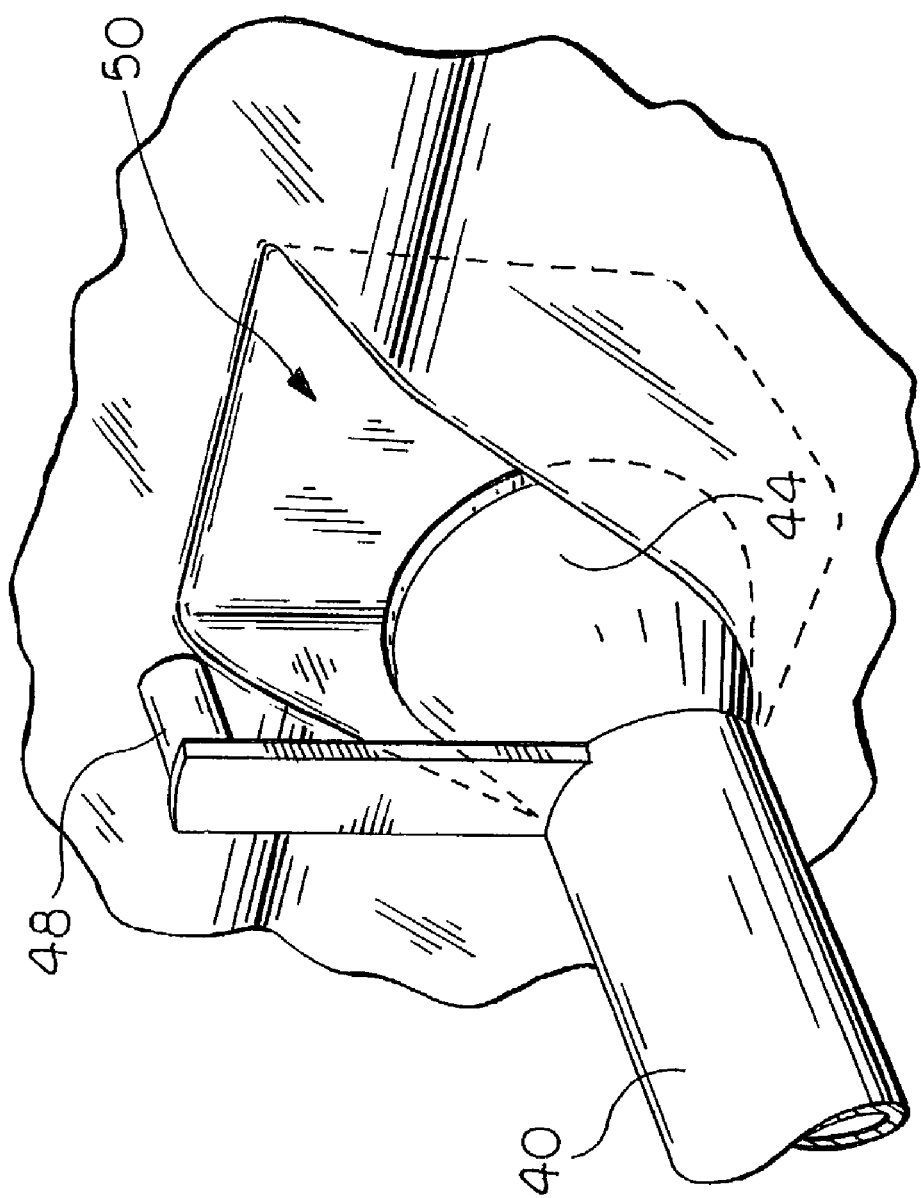
FIG. 3 is an enlarged fragmentary perspective view of a mounting for the ends of the supporting rods illustrated in FIGS. 1 and 2.

Referring to FIGS. 1, 2, and 3 of the drawings, there is illustrated a modular storage system for use within a vehicle. More specifically, there is illustrated such a storage system 10 for use in the rear cargo area or trunk of a passenger vehicle. The storage system 10 includes a plurality of modular units 12, 14, and 16. Each of the modular units is substantially identical in respect of the basic structural features. In order to simplify the understanding of the invention, only a single one of the units will be described in detail. In the embodiment shown, the modular unit 12 includes an enclosure 20 formed of a flexible fabric material of the type used in the manufacture of lightweight luggage. It is understood that the enclosure 20 can be formed from other durable materials such as plastic or lightweight aluminum, for example. The enclosure 20 includes an encircling side wall 22, a front panel 24, and a back panel, not shown, which is substantially of the same overall dimension as the front panel 24. A zipper fastener 26 encircles the front panel 24 to enable the user to obtain selective access to the interior of the enclosure 20. It is understood that other conventional fasteners can be used without departing from the scope and spirit of the invention. FIG. 2 shows the front panel 24 of the enclosure 20 being in an open position laying on the floor of the vehicle trunk. A pair of spaced apart handle straps 28 and 30 are suitably secured to the side wall 22, as by stitching, for example. The straps 28 and 30 may be formed of a flexible fabric material, such as nylon, and are employed to facilitate the manual transport of the module 12 should it be desired to remove the module 12 from the associated vehicle. It is understood that other conventional materials may be used for the straps 28 and 30 without departing from the scope and spirit of the invention.

It will be noted from an examination of FIG. 2 that a pair of stacked drawer-like members 32 and 34 are adapted to be received within the hollow interior of the enclosure 20. The drawer-like members 32 and 34 are preferably formed of a lightweight dimensionally stable material such as polystyrene, for example. When the front panel 24 is opened by causing the zipper 26 to be moved to an unzipped position, as illustrated in FIG. 2, the front panel 24 may be flat against the vehicle cargo area floor. In the opened position, the user may manipulate the drawers 32 and 34 for the storage or removal of items, such as clothing, for example.

In order to militate against movement of the modules 12, 14, and 16 while the vehicle is in motion, a support mechanism is employed. The support mechanism includes a generally horizontally disposed support rod 40 which is designed to span the distance between two spaced apart fixed vehicle components, such as rear quarter panels, for example. Each end of the rod 40 is provided with a frusto-conically shaped connector 42 and 44, each provided with a manually graspable handle 46 and 48, respectively.

The ends of the rod 40 with the connectors 42 and 44 are adapted to be received in brackets attached to or cavities formed in the vehicle components. In the illustrated embodiment, as clearly seen in FIG. 3, a cavity 50 is provided having generally V-shaped opening for receiving the connector 44. Since the opening is V-shaped, the connector 44 tends to snuggly fit therein. The tapered wall of the conical connector 44 tends to assist in forming the desired snug engagement between the ends of the support rod 40 and the associated vehicle. Also, the tapered configuration will allow for slight variances in the spacing between the connector receiving openings or brackets which are integral with the vehicle to which the storage system of the invention is to be used. While the drawings illustrate the rod 40 as being of a fixed length, it will be understood that a tension rod arrangement could be utilized which would permit the system to be used with vehicles having different sized platforms and cargo areas.

A generally U-shaped tubular bracket assembly 52 formed of a pair of arms caused to extend in parallel spaced relation from the support rod 40 and bent upon themselves to extend in an opposite direction and joined by a central portion forming a completed U-shape. The central portion of the assembly 52 is received by and caused to travel under the spaced apart straps 28 and 30 to effectively anchor the enclosure 20 of the module 12 in place and resist any movement thereof during transit of the associated vehicle.

The accompanying modules 14 and 16, while of differing dimensions from the module 12 explained in the aforesaid description, include the same structural features and are used for storing different articles. The modules could contain internal structures to hold tapes, CDs, DVDs, dirty laundry, cosmetics, and toiletries, for example. Certain of the internal and external components could include heated or cooled insulated containers. Such containers can be formed from any conventional insulating material such as a foam insulation or an insulated fabric or fabric laminate, for example.

Figure 4:
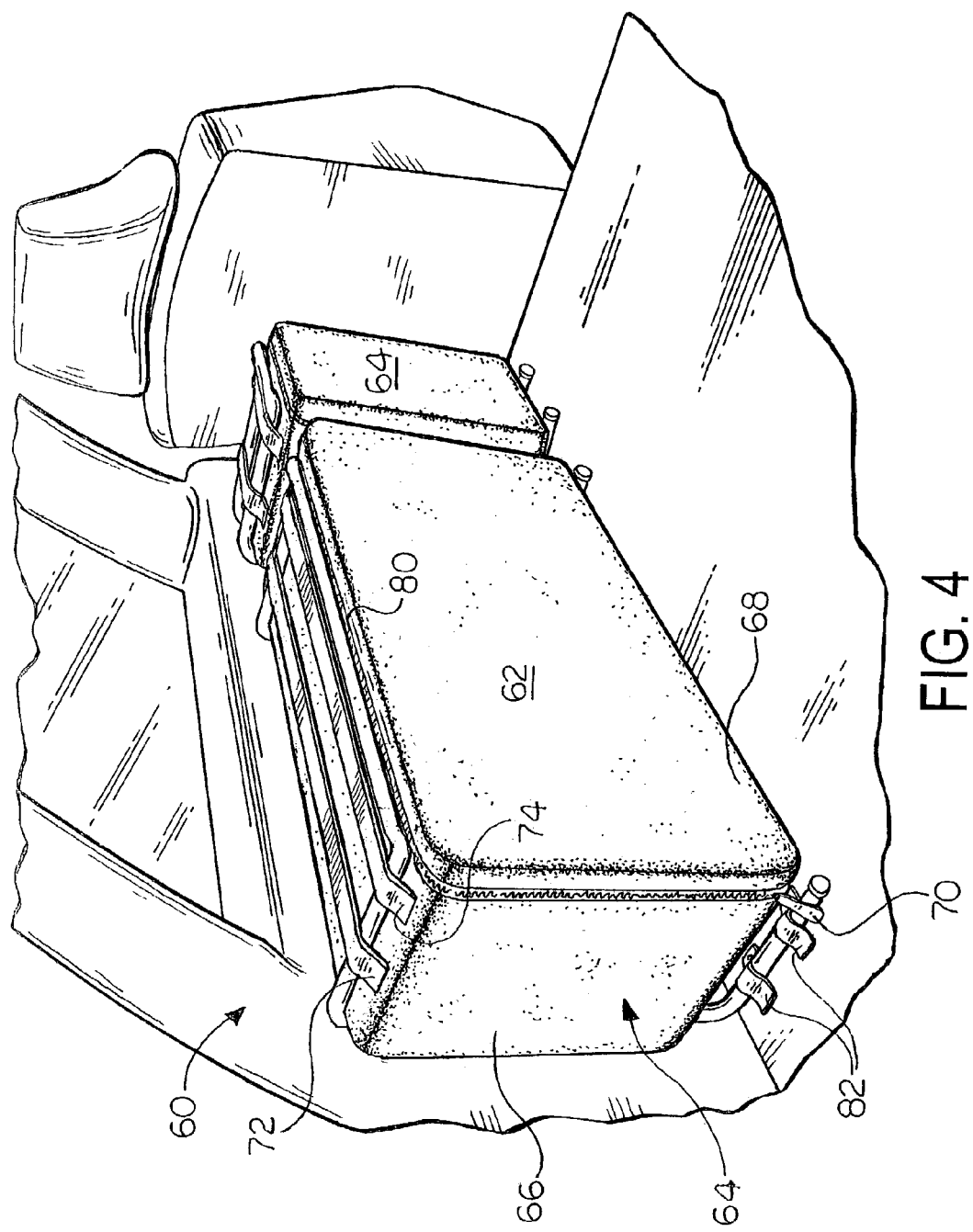
FIG. 4 is a fragmentary perspective view of another embodiment of a modular storage system disposed behind the back seat of a vehicle of the van type.

FIG. 4 illustrates another embodiment of the invention wherein the modular storage system is designed to extend along the longitudinal axis of an associated vehicle in contrast to the embodiment illustrated in FIGS. 1, 2, and 3 wherein the system extended transversely of the longitudinal axis of the vehicle. The storage system illustrated in FIG. 4 is generally indicated by reference numeral 60 and is shown to be installed in the rear cargo area of a van or sport utility vehicle (SUV). More specifically, the storage system 60 includes a plurality of modular units 62 and 64, each of which is substantially identical, in respect of the basic structural features. In order to simplify the understanding of the invention, only a single one of the units will be described in detail. In the embodiment shown, the modular unit 62 includes an enclosure 64 formed of a flexible fabric material of the type used in the manufacture of lightweight luggage. It is understood that the enclosure 64 can be formed from other durable materials such as plastic or lightweight aluminum, for example. The enclosure 64 includes an encircling side wall 66, a front panel 68, and a back panel, not shown, which is substantially the same overall dimension as the front panel 68. A zipper fastener 70 encircles the front panel 68 to enable the user to obtain selective access to the interior of the enclosure 64. It is understood that other conventional fasteners can be used without departing from the scope and spirit of the invention. FIG. 4 shows the front panel 68 of the enclosure 64 being in a closed position. A pair of spaced apart handle straps 72 and 74 are suitably secured to the side wall 66, as by stitching, for example. The straps 72 and 74 may be formed of a flexible fabric material, such as nylon, and are employed to facilitate the manual transport of the module 62 should it be desired to remove the module 62 from the associated vehicle. It is understood that other conventional materials may be used for the straps 72 and 74 without departing from the scope and spirit of the invention.

It will be noted from an examination of FIG. 4 that the module 62 may contain a pair of stacked drawer-like members similar to those illustrated in FIGS. 1 and 2, adapted to be received within the hollow interior of the enclosure 64. When the front panel 68 is opened by causing the zipper 70 to be moved to an unzipped position, the front panel 68 may lay flat against the vehicle cargo area floor. In the opened position, the user may manipulate the interior contents.

In order to militate against movement of the modules 62 and 64 while the vehicle is in motion, a support mechanism is employed. In the embodiment shown, the support mechanism includes a generally U-shaped tubular assembly 80 formed to have a pair of tubular arms caused to be bent upon themselves to form a generally C-shaped configuration to receive the module 62 between the spaced apart section of the bent assembly 80. The tubular assembly 80 may be affixed to the floor of the cargo area of a vehicle by brackets 82 by suitable threaded fasteners. Other fastener means can likewise be satisfactorily employed such as, for example, hook and eye type fasteners. Also, while the preferred embodiment illustrates the tubular assembly 80 being fastened to the floor of a vehicle, it will be understood that it could also be fastened to the adjacent trunk panel. It is also understood that equivalent support mechanisms could be used without departing from the scope and spirit of the invention. For example, the storage system could be disposed in a tray which supports the modules 62 and 64. Such a tray could be pivotally supported in the vehicle to permit the storage system to be pivoted into and out of a loading position transverse to a longitudinal axis of the vehicle.

In accordance with the provisions of the patent statutes, the present invention has been described in what is considered to represent its preferred embodiment. However, it should be understood that the invention can be practiced otherwise than as specifically illustrated and described without departing from its spirit or scope.

What is claimed is:

1. A modular storage system for the cargo area of a motor vehicle comprising:
   - at least one enclosure defined by a front wall, a back wall, and an encircling side wall extending between the front and back walls, wherein the enclosure is formed of flexible sheet material, has a hollow interior, and includes a selectively operable closure to provide access to the hollow interior;
   - a strap affixed to the side wall of the enclosure;
   - a dimensionally stable storage container slidingly received within the hollow interior of the enclosure;
   - a support rod having first and second end portions, the support rod extending between two spaced apart supports in the vehicle;
   - an arm connected to the support rod and received between the strap and the side wall of the enclosure; and
   - a fastener for anchoring the support rod to the spaced apart supports in the vehicle wherein the fastener includes a wedge shaped member affixed to each end portion of the support rod.

2. The invention defined in claim 1 wherein the bracket connects the enclosure to the support rod such that the support rod is positioned above the enclosure to suspendedly support the enclosure.

3. The invention defined in claim 2 wherein the arm is a U-shaped tubular member.

4. A modular storage system for a vehicle comprising:
   - an enclosure defining an interior, the enclosure having a front panel, a rear panel and a side panel, wherein the side panel defines an encircling side wall of the enclosure;
   - a dimensionally stable storage container slidingly received within the interior of the enclosure;
   - a strap attached to the side panel;
   - a support rod configured to extend between two spaced apart supports;
   - a bracket arm extending from the support rod;
   - wherein the strap is configured to be mounted onto the bracket arm such that the bracket arm is received between the side panel and the strap; and
   - the support rod is above the enclosure suspendedly supporting the enclosure in the vehicle.

5. The modular storage system defined in claim 4 wherein the bracket arm includes a pair of spaced apart arms extending from the support rod, the pair of arms having first ends connected to the support rod and second ends connected to each other.

6. The modular storage system defined in claim 5 including a fastener for anchoring the support rod to the spaced apart supports;
   - wherein the support rod has first and second end portions and the fastener includes a wedge shaped member affixed to each end portion of the support rod.

7. A modular storage system for a vehicle comprising:
   - an enclosure defining an interior, the enclosure having a front panel, a rear panel and a side panel;
   - a strap attached to the side panel;
   - a support rod configured to extend between two spaced apart supports;
   - a fastener for anchoring the support rod to the spaced apart supports, wherein the support rod has first and second end portions and the fastener includes a wedge shaped member affixed to each end portion of the support rod;
   - a bracket arm extending from the support rod;
   - wherein the strap is configured to be mounted onto the bracket arm such that the bracket arm is received between the side panel and the strap; and
   - the support rod is above the enclosure suspendedly supporting the enclosure in the vehicle.

* * * * *